United States Patent [19]
Kaibel et al.

[11] Patent Number: 5,914,012
[45] Date of Patent: Jun. 22, 1999

[54] DIVIDING WALL COLUMN FOR CONTINUOUS FRACTIONATION OF MULTICOMPONENT MIXTURES BY DISTILLATION

[75] Inventors: Gerd Kaibel, Lampertheim; Manfred Stroezel, Ilvesheim; Udo Rheude, Otterstadt, all of Germany

[73] Assignee: BASF Aktiengesellschaft, Ludwigshafen, Germany

[21] Appl. No.: 08/845,226

[22] Filed: Apr. 21, 1997

[30] Foreign Application Priority Data

Apr. 30, 1996 [DE] Germany .................. 196 17 210

[51] Int. Cl.⁶ .................................................. B01D 3/16
[52] U.S. Cl. .................. 202/158; 196/111; 196/133; 196/137; 159/DIG. 41; 159/DIG. 42; 261/DIG. 72
[58] Field of Search ..................... 202/158, 152, 202/269, 153, 160; 196/111, 133, 137; 261/114.1, 148, DIG. 72; 203/2, 99, DIG. 19; 159/DIG. 41, DIG. 42

[56] References Cited

U.S. PATENT DOCUMENTS

| | | | |
|---|---|---|---|
| 4,179,487 | 12/1979 | Chekhov et al. | 261/114.1 |
| 4,200,600 | 4/1980 | Myreen | 202/158 |
| 4,201,626 | 5/1980 | Asdigian | 202/158 |
| 4,230,533 | 10/1980 | Giroux | 202/158 |
| 4,247,368 | 1/1981 | Bannon et al. | 202/158 |
| 5,339,648 | 8/1994 | Lockett et al. | 202/158 |
| 5,585,046 | 12/1996 | Jansen et al. | 261/97 |
| 5,709,780 | 1/1998 | Ogmisty et al. | 202/158 |

FOREIGN PATENT DOCUMENTS

| | | |
|---|---|---|
| 640 367 | 3/1995 | European Pat. Off. . |
| 33 02 525 | 1/1983 | Germany . |
| 4336983 | 10/1993 | Germany . |
| 4336985 | 10/1993 | Germany . |
| 60-00879 | 1/1985 | Japan . |

OTHER PUBLICATIONS

*Chem. Eng. Techn.*, vol. 10, 1987, pp. 92–98.
*Chem. Eng. Techn.*, vol. 61, No. 2, 1989, pp. 104–112.

*Primary Examiner*—Virginia Manoharan
*Attorney, Agent, or Firm*—Keil & Weinkauf

[57] ABSTRACT

A dividing wall column for separating a mixture into 3 or more fractions by distillation is described, where at least one dividing wall is detachably attached within the dividing wall column.

3 Claims, 4 Drawing Sheets

DIVIDING WALL COLUMN FOR CONTINUOUS FRACTIONATION OF MULTICOMPONENT MIXTURES BY DISTILLATION

The present invention relates to a novel dividing wall column for separating a mixture into three or more fractions by distillation and to an improved process for separating mixtures by distillation.

Various process variants are customary for continuous fractionation of multicomponent mixtures by distillation. In the simplest case, the feed mixture is fractionated into 2 fractions, a low-boiling overhead fraction and a high-boiling bottom fraction. When feed mixtures are separated into more than 2 fractions, a plurality of distillation columns must be used in this process variant. In order to restrict the expenditure on apparatus, when multicomponent mixtures are being separated, if possible columns having vapor or liquid sidestream takeoffs are used. However, the potential for use of distillation columns having sidestream takeoffs is greatly restricted by the fact that the products taken off as sidestreams are never completely pure. When sidestreams are taken off in the enrichment section, conventionally in liquid form, the sidestream product still contains portions of low-boiling components which are to be separated off overhead. Correspondingly, sidestream takeoffs in the stripping section, generally in the vapor phase, still have contents of high-boilers. The use of conventional sidestream takeoff columns is therefore restricted to cases in which impure sidestream products are permissible.

Dividing wall columns offer a remedy here. This type of column is described in DE 3302525 A1 and in the specialist literature, for example in Chem. Eng. Technol. 10 (1987) pages 92–98 and in Chem.-Ing.-Tech. 61 (1989) No. 2 pages 104–112. With this type of column it is also possible to take off sidestream products in pure form. This decreases the total number of distillation columns required when multicomponent mixtures are separated. Since this type of column represents a simplified type of thermally coupled distillation column, it has, in addition, a particularly low energy consumption. Thermally coupled distillation columns are likewise described in said specialist literature references. Dividing wall columns, in comparison with the arrangement of conventional distillation columns, offer advantages of about 30% with respect to both energy consumption and capital expenditure and are therefore being increasingly used in industry.

A disadvantage of the use of dividing wall columns is that, owing to the dividing wall attached in the column, they have a mechanical structure deviating from conventional columns. Retrofitting is associated with considerable expenditure and downtimes. Therefore, the use of dividing wall columns has been principally restricted to date to newly installed columns. In retrofitting, a switch is frequently made to the compromise solution of a thermally coupled column.

It is an object of the present invention, therefore, to remedy said disadvantages and to simplify further the refitting of existing dividing wall columns and the new assembly of dividing wall columns.

We have found that this object is achieved by a dividing wall column for separating a mixture into three or more fractions by distillation, wherein at least one dividing wall is detachably attached within the dividing wall column. In addition, processes for separating mixtures by distillation using the dividing wall column of the invention have been found.

The novel dividing wall columns are described in more detail below with reference to the drawings.

DETAILED DESCRIPTION OF THE INVENTION

Figure 3:
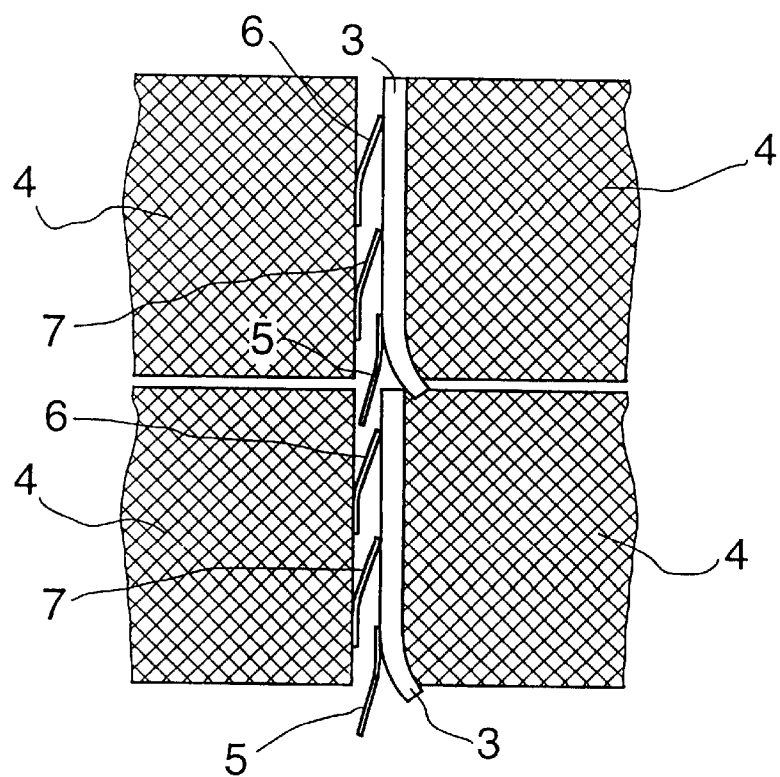
FIG. 3 shows a construction wherein the subdivision of liquid and vapor streams in the longitudinal direction is effected by diving elements attached directly to the arranged column packing.

According to the invention, a special constructional arrangement is provided which makes attaching dividing walls in the column unnecessary. This novel dividing wall column, with or without packings, does not have fixed, for example welded, dividing walls in the column body. A first possible construction is that the subdivision of liquid and vapor streams in the longitudinal direction is effected by dividing elements attached directly to the arranged column packing (FIG. 3). The dividing wall 3 is then a structural element integrated into the packing 4 and is fixed to it. The wall thickness of this sheet 3 joined to the packing can be kept markedly lower, at approximately from 0.1 to 3, preferably from 1 to 2, mm, than would be the case with a fixed dividing wall in the column body, in which case the preferred wall thickness is 5–10 mm. These packings, especially in the case of refitting existing conventional columns, lead to cost savings and to short refitting times.

To seal packing layers placed one above the other, a roof-type shaping of the dividing wall integrated into the packing is advisable. FIG. 3 shows a simple structural solution, in which the integrated dividing wall 3 is made from about 1 to 10 mm longer than the packing 4 joined to it at the top and bottom ends and, at the bottom end, has an additional sheet strip 5 which is from about 10 to 20 mm wide and from about 0.1 to 2 mm thick. When the individual packing layers are assembled, a roof-shaped overlapping is formed which prevents liquid from crossing over and is also sealed sufficiently tightly against crossing over of vapors. Other sealing measures customary in engineering are possible as alternatives to this particularly simple structural solution.

Figure 1:
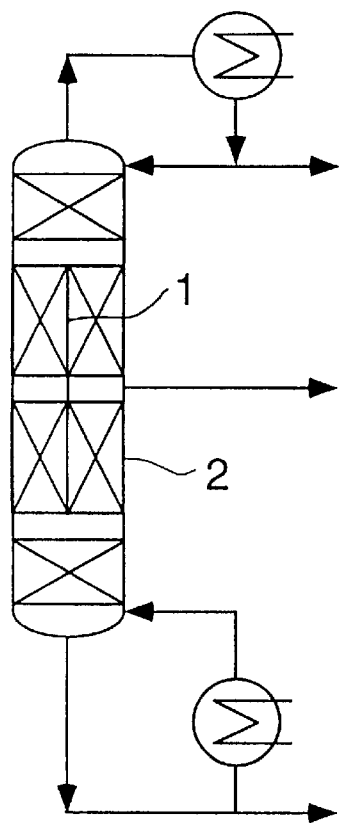
FIG. 1 shows a dividing wall column (2) having a fixed dividing wall (1) as has been customarily used hitherto.
Figure 2:
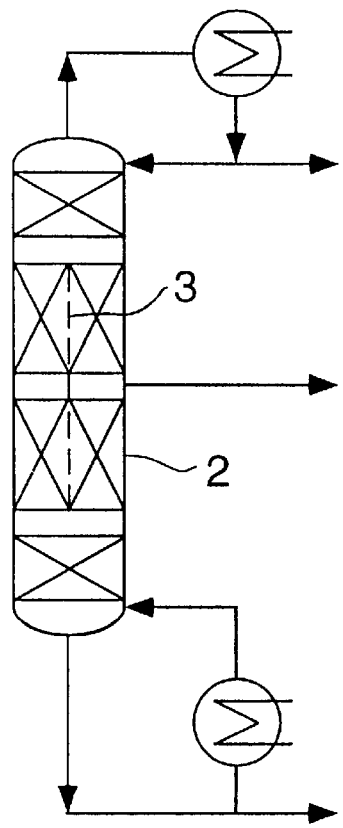
FIG. 2 shows a novel dividing wall column (2) having a plurality of detachable dividing walls (3) arranged one above the other.
Figure 4:
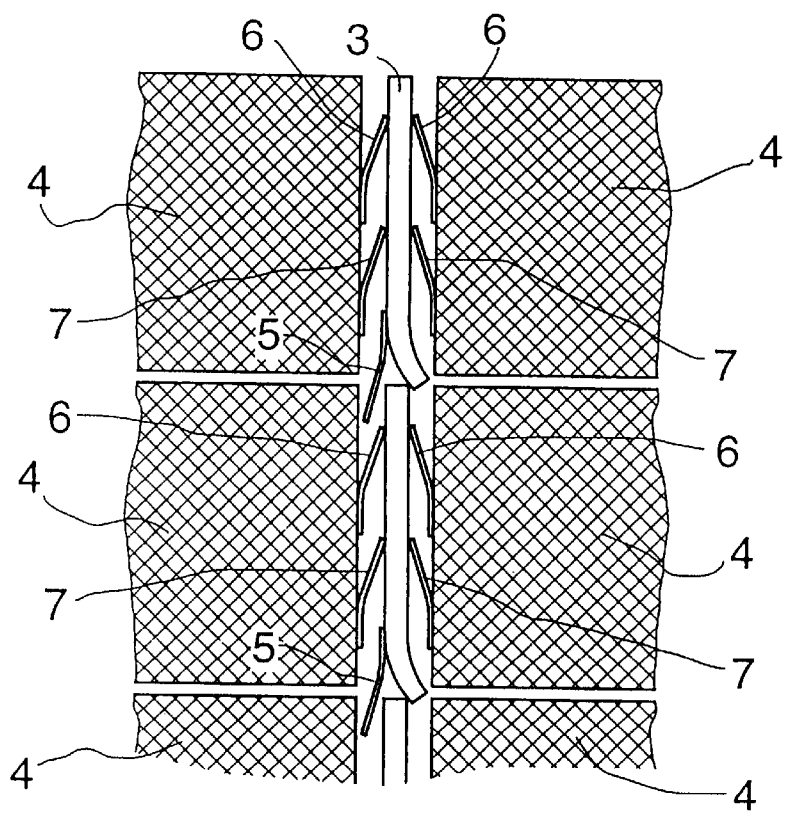
FIG. 4 is another variation of a column which includes liquid deflectors 6 and spacers 7.

Another, still simpler possibility does not provide for integrating the dividing wall into the packing, but attaching it loosely between the individual packings 4, as a loose sheet 3 from about 0.5 to 3 mm, preferably from 1 to 2 mm thick (FIG. 4). The packings in this case can be used in the same design having liquid deflectors 6 and spacers 7 as is the case with conventional rigidly attached dividing walls. In this case also, it is advantageous to attach sheet strips 5 for sealing. Individual sheets 3 can be made with a height corresponding to the packing layers, or else greater than this.

As results from industrially fabricated columns show, in the case of large column diameters of sufficient roundness and moderate purity requirements for the medium-boiler fraction, lateral sealing by sealing elements is not necessary.

Figure 5:
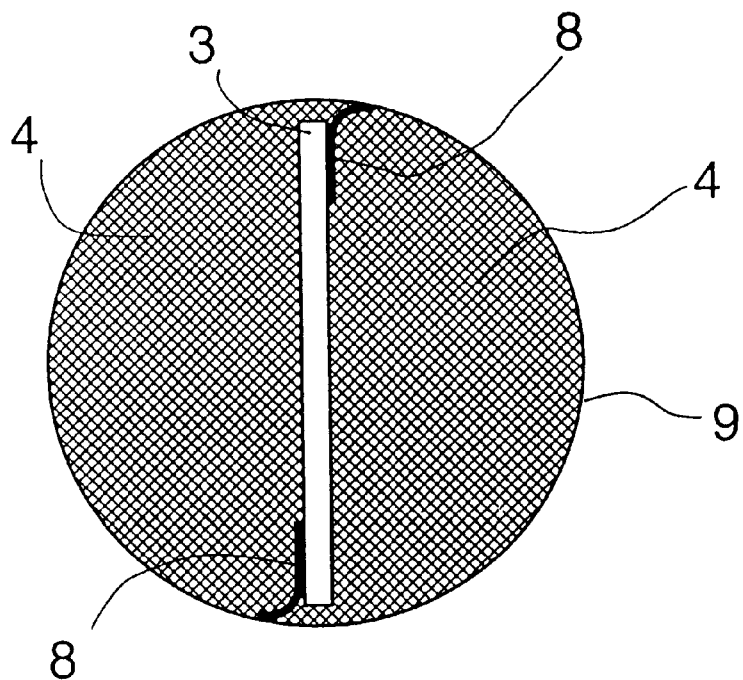
FIG. 5 is a cross section of a column employing a sprung sealing lip 8.

It is only required with highly non-round column sections and product specifications for the medium-boiler fraction greater than about 99.8%. A gap width from 1 to 2 mm should not be exceeded between the integrated dividing wall and the column wall. If lateral sealing is required, a simple possible method is to attach a sprung sealing lip 8 made of a thin sheet, which acts as seal to the column wall 9 (FIG. 5).

Most effectively, contamination of the medium-boiler fraction by lower- or higher-boiling components due to incomplete sealing of the dividing walls attached to the packing layers may be prevented by the pressure along the height of the column being influenced on both sides of the longitudinal subdivision in such a manner that the pressure on the takeoff side is always somewhat higher or equal to that on the feed side. This may be achieved in a simple manner by the packings ending higher, having a greater packing height or having a higher pressure drop—for example due to narrower flow cross sections in the packing—on the takeoff side than on the feed side.

Figure 6:
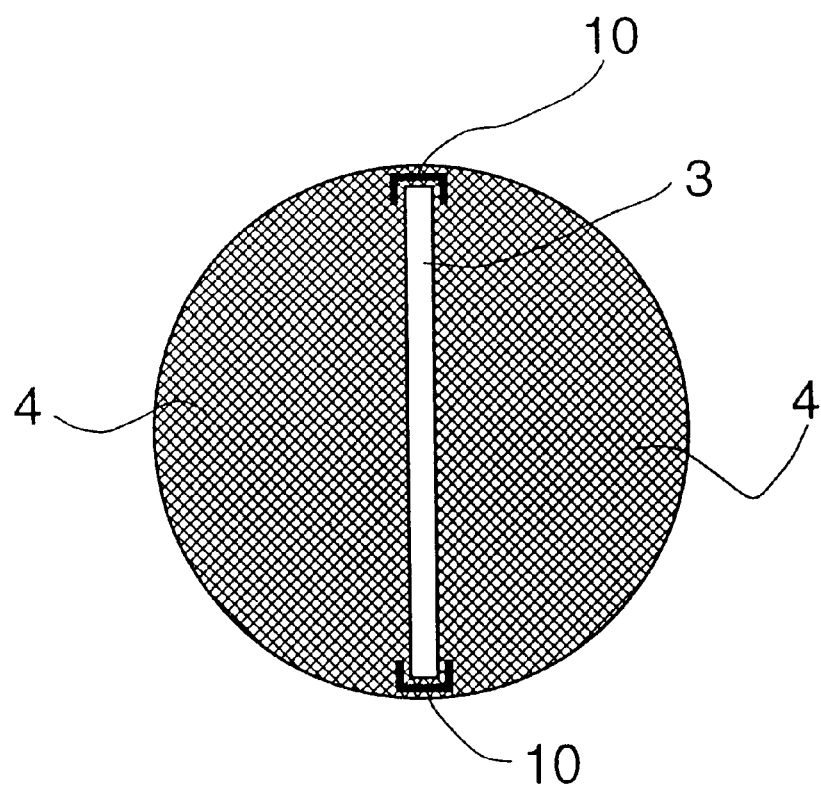
FIG. 6 is a cross section of a column employing U-shaped guide rails 10.
Figure 7:
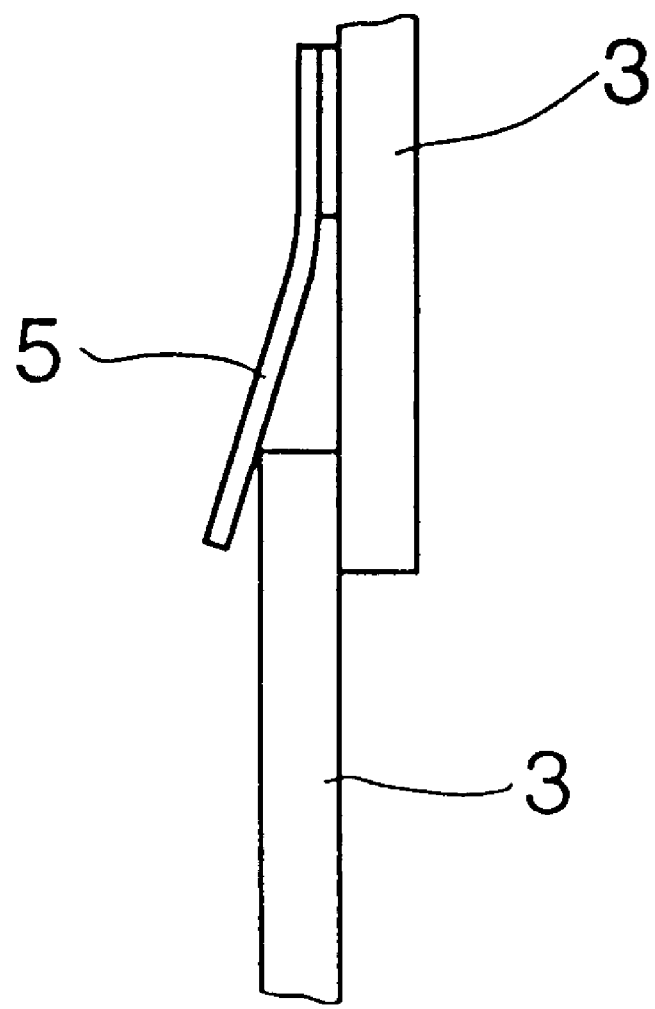
FIG. 7 is a showing of a detail of FIG. 3.

It is also possible to use conventional packing layers without an integrated dividing wall and to attach the dividing walls separately, preferably loosely, in the column body. It is particularly simple to attach to the column walls U-shaped guide rails 10 into which the dividing walls 3 are pushed (FIG. 6). In this case, the dividing walls can be made longer, for example having a length of from 1 to 2 m, in order to keep their number small. The wall thickness should be from about 3 to 10 mm, in order to achieve adequate rigidity.

With this design of the dividing walls, it is also possible to use random packings, for example Pall rings. If the loose dividing walls are to be attached away from the center of the column cross section, a guide will always be necessary, since otherwise adequate lateral sealing is not ensured.

In the area of the liquid collectors and liquid distributors between the individual packing layers, it is most expedient to provide in each case a single sheet piece as longitudinal subdivision.

In the case of tray columns, attaching longitudinal subdivisions is simplest with dual-flow trays. In this case, rectangular planar sheets are sufficient, which are pushed, for example, into U-shaped guide rails which are attached at the column wall and on the top side of the tray and/or on the bottom side of the tray.

Sieve trays, valve trays and bubble-cap trays require a more complex geometry of the longitudinal subdivision, since the downcomer must also be subdivided. Construction is simplest when the longitudinal subdivisions are each arranged perpendicularly to the weirs.

In the distillation process for separating a mixture using the dividing wall column of the invention, the dividing wall column is preferably operated in such a manner that the pressure on the takeoff side is greater than or equal to that on the feed side.

We claim:

1. A dividing wall column for separating a mixture into 3 or more fractions by distillation, wherein
    A) a plurality of dividing walls are detachably attached within the dividing wall column,
    B) the dividing wall column contains arranged packings in which the dividing walls are each attached to one side of the packing as from 0.1 to 3.0 mm thick sheets, and
    C) the sheets extend at the top or bottom end from 1 to 10 mm beyond the packing, and, at the bottom end of each sheet, have a from 10 to 20 mm wide and from 0.1 to 2 mm thick sheet strip which is joined only at its top edge to the dividing wall in such a way that when packing layers are stacked one above the other, a roof-shaped, at least partially sealing overlapping is formed which prevents liquid from crossing over from one side to the other side of the dividing wall and is also sealed sufficiently tightly against the crossing over of vapors.

2. A dividing wall column for separating a mixture into 3 or more fractions by distillation, wherein
    A) at least one dividing wall is detachably attached within the dividing wall column,
    B) the dividing wall column contains packings for separating mixtures, and
    C) the at least one dividing wall is loosely attached as from a 0.5 to 3 mm thick sheet between the packings.

3. A dividing wall column for separating a mixture into 3 or more fractions by distillation, wherein
    A) a plurality of dividing walls are detachably attached within the dividing wall column,
    B) the dividing wall column contains arranged packings in which the dividing walls are each attached to one side of the packing as from 0.1 to 3 mm thick sheets and
    C) the dividing walls are laterally sealed by sprung sealing lips.

* * * * *